(12) United States Patent
Gossweiler, III et al.

(10) Patent No.: US 8,717,401 B1
(45) Date of Patent: May 6, 2014

(54) SECURE, LOCATION-BASED VIRTUAL COLLABORATION

(75) Inventors: Richard Carl Gossweiler, III, Sunnyvale, CA (US); Ullas Gargi, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 248 days.

(21) Appl. No.: 13/300,378

(22) Filed: Nov. 18, 2011

(51) Int. Cl.
*H04N 7/14* (2006.01)

(52) U.S. Cl.
USPC .................................................. 348/14.01

(58) Field of Classification Search
USPC .......... 348/14.01, 14.02, 14.03, 14.04, 14.08, 348/14.09; 379/91.01, 91.02, 93.12
See application file for complete search history.

(56) References Cited

U.S. PATENT DOCUMENTS

| | | |
|---|---|---|
| 2004/0169722 A1 | 9/2004 | Pena |
| 2012/0160912 A1* | 6/2012 | Laracey ........................ 235/379 |
| 2012/0265679 A1* | 10/2012 | Calman et al. .................. 705/43 |
| 2013/0005253 A1* | 1/2013 | Grigg et al. .................. 455/41.1 |

OTHER PUBLICATIONS

"IBM's Virtual Bank Teller," [online]. Kiock Europe, Sep. 5, 2008. First Accessed on Sep. 1, 2011. Retrieved from the Internet: <http://www.kioskeurope.com/content/money-bank> 1 pg.
"IBM unveils virtual teller," [online]. Finextra Research, May 13, 2008. First Accessed on Sep. 1, 2011. Retrieved from the Internet: <http://www.finextra.com/News/Fullstory.aspx?newsitemid=18455> 2 pgs.
Pikal, "Video Conferencing ATMs to Outsource Banking Industry," [online]. Mobile Magazine, May 18, 2011. First Accessed on Sep. 1, 2011. Retrieved from the Internet: <http://www.mobilemag.com/2011/05/18/video-conferencing-atms-will-outsource-bank-tellers/> 3 pgs.

\* cited by examiner

*Primary Examiner* — Stella Woo
(74) *Attorney, Agent, or Firm* — IP Spring

(57) ABSTRACT

Aspects of the present disclosure may provide a secure, location-based multimedia experience to users. In one example, a method includes receiving, by one or more computing devices, location information corresponding to a physical location of a user. The method may include receiving, by the one or more computing devices, personal identification information associated with the user. The method may also include authenticating, by the one or more computing devices, the physical location of the user based at least in part on the location information and the personal identification information of the user. The method may further include upon successful authentication of the physical location and the personal identification information of the user, coupling, by the one or more computing devices, a first computing device associated with the user to a video communication session.

20 Claims, 7 Drawing Sheets

SECURE, LOCATION-BASED VIRTUAL COLLABORATION

TECHNICAL FIELD

This disclosure relates to electronic devices and, more specifically, to virtual collaboration between electronic devices.

BACKGROUND

Customers of business entities may conduct business and/or discuss matters with representatives of the business entity. In some examples, business entities may include multiple representatives to service customers physically present in a store associated with the business entity. In some examples, customers may enter the store to engage with a representative of the business in-person. If no representatives are currently available, the customer may wait until a representative is available.

SUMMARY

In one example, a method includes receiving, by one or more computing devices, location information corresponding to a physical location of a user from a first computing device, and receiving, by the one or more computing devices, personal identification information associated with the user from the first computing device. The method may further include authenticating, by the one or more computing devices, the physical location of the user based at least in part on the location information and the personal identification information of the user. The method may further include, upon successful authentication of the physical location and the personal identification information of the user, coupling, by the one or more computing devices, the first computing device associated with the user to a video communication session, where the video communication session enables communication between the first computing device and a second computing device.

In another example, a non-transient computer-readable storage medium comprising instructions that, when executed, cause one or more processors of one or more computing devices to perform operations. The operations may include receiving location information corresponding to a physical location of a user from a first computing device, and receiving personal identification information associated with the user from the first computing device. The operations may include, authenticating the physical location of the user based at least in part on the location information and the personal identification information of the user. Additionally, the operations may further include upon successful authentication of the physical location and the personal identification information of the user, coupling the first computing device associated with the user to a video communication session, where the video communication session enables communication between the first computing device and a second computing device.

In another example, a server includes one or more computing devices, the one or more computing devices being configured to perform a method. The method may include receiving location information corresponding to a physical location of a user from a first computing device, and receiving personal identification information associated with the user from the first computing device. The method may further include authenticating the physical location of the user based at least in part on the location information and the personal identification information of the user. The method may further include, upon successful authentication of the physical location and the personal identification information of the user, coupling the first computing device associated with the user to a video communication session, where the video communication session enables communication between the first computing device and a second computing device.

The details of one or more embodiments are set forth in the accompanying drawings and the description below. Other features, objects, and advantages will be apparent from the description and drawings, and from the claims.

Figure 1:
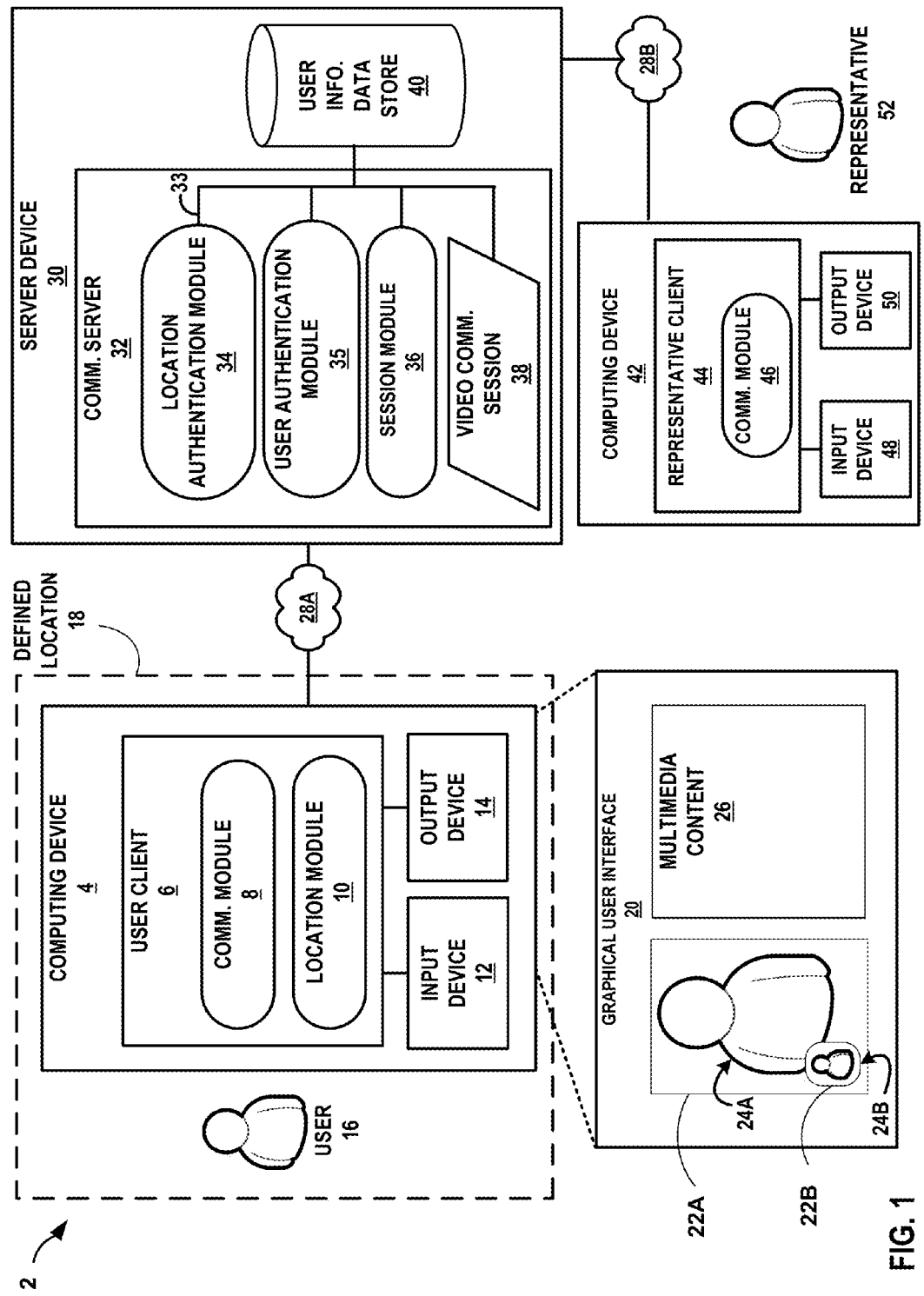
FIG. 1 is a block diagram illustrating an example of a communication system in which one or more client devices are coupled to a server device that enables communication between users associated with the client devices, in accordance with one or more aspects of the present disclosure.

Various embodiments have been described. These and other embodiments are within the scope of the following claims.

DETAILED DESCRIPTION

Overview

In an example embodiment, customers, business associates, and/or other individuals may physically enter a store of a particular business entity to facilitate business. Business entities may be equipped to handle a certain volume of customers. For example, the stores may have a certain number of employees physically working at the store to tend to customers. When there are more customers that require assistance than there are employees available to provide the assistance, customers may be required to wait for the next available employee. Thus, at various times, customers may be subject to long wait times and possible frustration. In some instances, business entities provide an option for users to conduct business electronically (e.g., an automatic teller machine (ATM)). Depending on the nature of the business, the business may not be capable of being conducted electronically (e.g., via the ATM) or customers may not feel comfortable facilitating the business electronically. For example, certain business transactions may include exchanging personal and/or sensitive information and customers may prefer to conduct the business in-person (e.g., with an employee physically present at the store).

Rather than interacting together in the same physical location, techniques of this disclosure may, in various instances, provide a mechanism for two or more individuals to interact in the same virtual location (e.g., by providing a secure, location-based multimedia experience). A secure, location-based multimedia experience may be implemented as a virtual space where users can engage in a conversation and/or share information. In some examples, secure, location-based multimedia experiences may be used by customers to communicate with remote employees (e.g., representatives) of a business to, among other things, facilitate business transactions.

In one aspect of the present disclosure, a secure, location-based multimedia experience may be provided by a video communication session. The term "video communication session" as used herein is a broad term encompassing as its plain and ordinary meaning, including but not limited to, one or more objects, which may be stored in and/or are executable by hardware, that may enable communication clients coupled to the one or more objects to exchange information. The one or more objects may include data and/or provide functionality of a video communication session as described herein.

The video communication session may enable users associated with computing devices connected to the video communication session to communicate (e.g., engage in a secure, location-based multimedia experience). In some examples, the video communication session may enable communication between users by exchanging both audio and visual information. In some aspects of this disclosure, a customer (e.g., a user) may engage in a secure, location-based multimedia experience by coupling to a video communication session after the customer's location and personal information have been authorized. That is, prior to being allowed to couple to the video communication session, a customer is authenticated based on physical location information and personal identification information provided by the customer.

Techniques of the present disclosure may enable authorized users (e.g., a user's whose physical location and personal identification information have been authenticated) to easily join and exit video communication sessions to conduct business. By allowing authorized customers to facilitate business with the remote employee via the video communication session the customer's confidence in the legitimacy of the business representative and comfort with conducting business with a remote representative may be increased. Additionally, the efficiency of the business may increase by decreasing the time customers may need to wait to receive attention from a business representative and increasing staffing flexibility.

In general, aspects of the present disclosure are directed to techniques that may provide a secure, location-based multimedia experience to customers conducting business and/or seeking to discuss a matter with a business entity. In some examples, a particular business location associated with the business entity may have authentication information that enables customers to connect to a video communication session of the business entity. That is, a defined location, such as a physical business location associated with the business entity (e.g., a branch of a bank), may provide a basis for allowing a customer to communicate with a business association using the video communication session. In other examples, a video communication terminal or other location that may not have business associates physically present at the location may be used, in part, as authentication information enabling customers to connect to a video communication session. For example, a bank may provide a defined location that is not within the bank (e.g., at a mall) such that users may engage in banking activity without having to be physically present at a bank, but will have the confidence of interacting with a representative from the bank.

A communication server that implements techniques of the disclosure may receive location information corresponding to a physical location of a user. The communication server may authenticate the physical location of the user by determining whether the physical location of the user is within a defined location. If the physical location of the user is authenticated, communication server may prompt the user to enter personal identification information for authentication. If the personal identification information is authenticated, communication server may couple computing devices associated with the user and a representative of the business entity (e.g., remote teller) to a video communication session that provides for sharing of audio and video data.

The video communication session may enable users associated with computing devices connected to the video communication session to communicate. In some examples, the video communication session may enable communication between users of both audio and visual information. In one example, after a user's location and identify is authenticated his or her computing device may send a request to couple to a video communication session to a communication server executing on a computing device. In one example, a user may couple to an existing video communication session where a representative of the business entity is already coupled to the video communication session. In other examples, a user may start and/or create a new video communication session where, upon successful authentication, a computing device associated with the user and the representative from the business entity may couple to the video communication session. The communication server may send a message to the computing device of the user that enables the user's computing device to couple to the video communication session. The communication server may also send a message to the computing device of the representative that enables the representative's computing device to couple to the video communication session.

As described throughout this disclosure a user or representative may "join" a video communication session when a user or agent client of a computing device associated with the user or agent couples, e.g., establishes a connection, to a communication server executing on a server device and/or other computing device. In some examples, a user client executing on a computing device joins a video communication session by operatively coupling to a video communication session managed by a communication server executing on a server device and/or other computing device.

In one specific example, a bank may provide the option for users (e.g., customers) to conduct banking business with remote tellers instead of, for example, waiting in line to interact face-to-face with a teller physically present at the bank. A user electing to engage a remote teller may enter a banking booth. A physical location of the user may be determined using a computing device of the user or having the user enter a randomly generated code provided within the banking booth. Once the physical location of the user is authenticated, the user may be prompted to enter personal identification information (e.g., a personal identification number (PIN)) associated with the user's account at the bank to authenticate the user's identity. Once both the location and identity of the user have been authenticated, a communication server may couple the computing device associated with the user or another computing device to a video communication session.

As used throughout this disclosure, headings are included to improve the clarity of the disclosure and are not used to define separate embodiments. In some examples, features of various embodiments may be combined and/or used from among multiple headings in accordance with aspects of the present disclosure.

Example System

FIG. 1 is a block diagram illustrating an example of a communication system in which one or more client devices 4, 42 are coupled to a server device 30 that enables communication between users associated with client device 4, 42, in accordance with one or more aspects of the present disclosure. Computing device 4 may include input device 12, output device 14, and user client 6, which may further include communication module 8 and location module 10. As seen in FIG. 1, computing device 42 may include input device 48, output device 50, and representative client 44, which may further include communication module 46. Computing device 42 may be a computing device similar to computing device 4 that includes some, all, and/or different functionality than the functionality provided by user client 6 and communication module 8. Representative client 44 and communication module 46 may include some, all, and/or different functionality than the functionality provided by user client 6 and communication module 8.

As shown in FIG. 1, server device 30 includes communication server 32 and user information data store (UID 40). Each of computing devices 4, 42 and server device 30 may be operatively coupled by communication channels 28A, 28B (collectively referred to as "communication channels 28"), which in some examples may be wired or wireless communication channels capable of sending and receiving data. Examples of communication channels 28 may include a 3G wireless network or a Transmission Control Protocol and/or Internet Protocol (TCP/IP) network connection over the Internet.

Computing devices 4, 42 may be operatively coupled to a video communication session 38 that enables communication between user 2 associated with client device 4 and representative 52 associated with computing device 42. Examples of computing devices 4, 42, may include, be, or be part of a mobile computing device (e.g., a mobile phone, netbook, laptop, personal digital assistant (PDA), tablet computer, portable gaming device, portable media player, e-book reader, or watch), other computing devices (e.g., a desktop computer, or set top box), or televisions with one or more processors embedded therein or attached thereto. Computing devices 4 and 42 may be the same or different types of devices. For example, computing devices 4 and 42 may both be mobile phones. In another example, computing device 4 may be a mobile phone and computing device 42 may be a desktop computer.

Computing devices 4 and 42 may include one or more input devices (e.g., input devices 12 and 48). Input devices 12, 28 may include keyboards, pointing devices, microphones, and cameras capable of recording one or more images or video. Computing devices 4 and 42 may also include one or more output devices (e.g., output device 14 and 50). Examples of output devices 14, 50 may include a video graphics card, a computer display, a sound card, and speakers.

Computing device 4 of FIG. 1 may include user client 6. In some examples, user client 6 may be mobile or desktop computer applications that provide functionality described herein. User client 6 may include communication module 8 and location module 10, as shown in FIG. 1. User client 6 may exchange audio, video, text, or other information with other one or more client devices associated with other users and/or one or more representative device associated with a representative (e.g., computing device 42 associated with representative 52). Communication module 8 may cause output devices of computing device 4 to display a graphical user interface. For instance, communication module 8 may cause output device 14 to display graphical user interface (GUI) 20.

Communication module 8 may further include functionality that enables user client 6 of computing device 4 associated with user 16 to couple to one or more video communication sessions (e.g., video communication session 38). Two or more computing devices (e.g., computing device 4 and computing device 42) may join the same video communication session 38 to enable communication between the computing devices 4 and 42. Aspects of representative client 44 are further described in FIG. 7. As illustrated in FIG. 1, a single user client 6 and a single representative client 44 are coupled to the video communication session 38. However, one or more user clients 6 and one or more representative clients may be coupled to the video communication session 38.

User client 6 may include location module 10 that enables communication module 8 to send location information corresponding to a physical location of a user to server device 30. In one example, location module 10 may enable communication module 8 to send Global Positioning System (GPS) coordinates from computing device 4 associated with user 16 to server device 30. As discussed herein, the GPS coordinates may assist determining whether the physical location of user 16 is within a defined location 18. In one example, computing device 4 may include a GPS device. In some examples, the GPS device may send and receive information from a global navigation satellite system. In some examples, the GPS device may receive one or more physical location coordinates from the global satellite system that indicates a position of computing device 4. Thus, in some examples, the location module 10 may obtain and send GPS coordinates from the GPS device to server device 30 such that a physical location of computing device 4 may be determined and authenticated.

In some aspects of the present disclosure, user client 6 may enable user 16 to participate in a secure, location based multimedia experience with a representative requesting to facilitate a business transaction. Facilitating a business transaction may include, but is not limited to, conducting various business transactions as well as customer support and/or assistance. More generally, facilitating a business transaction may include any interacting that may be conducted with a representative of a business. As further described herein, user client 6 may couple to video communication session 38 after a physical location and identity of user 16 has been authenticated to facilitate business transactions. A representative client, such as representative client 44, may also connect to communication server 32. In this way, a representative may facilitate the business transaction using secure, location-based multimedia experience to users associated with computing devices coupled to a video communication session.

In some examples, input device 48, while coupled to video communication session 38 may generate a video feed of representative 52. The video feed may be based on video data of a still image or group of images. Representative client 44 may send the video feed to communication server 32, which may determine that user client 6 is coupled to video communication session 38. Consequently, communication server 32 may send the video feed of representative 52 to user client 6. User client 6, upon receiving the video feeds, may cause output device 14 to display the video feed as video feed 22A. Video feed 22A may include visual representations 24A of representative 52. User client 6 may further cause input device 12 to generate a video feed of user 16, which may be similarly sent in a video feed to representative client 44. User client 6 may further cause output device 14 to display the video feed as video feed 22B. Video feed 22B may include visual representations 24B of user 16. In this way, user 16 may view video data of him or herself along with a video data of a representative associated with a computing device coupled to video communication session 38.

In addition to exchanging video information (e.g., video data) the user and representative client may exchange audio and visual information via video communication session 38. For instance, microphones may capture sound at or near each of computing devices 4, 42, such as voices of user 16 and representative 52. Audio data generated by the user and representative clients from the sound, may be exchanged between the user and representative clients coupled to video communication session 38. For instance, if representative 52 speaks, input device 48 may receive the sound and convert it to audio data. Representative client 44 may then send the audio data to communication server 32. Communication server 32 may determine user client 6 is coupled to video communication session 38.

Upon determining that user client 6 is coupled to video communication session 38, communication server 32 may send the audio data to user client 6. After receiving the audio data, user client 6 may cause output devices, for example, sound cards and/or speakers of computing devices 4 to output sounds based at least in part on the audio data.

In still other examples, text, such as real-time instant messages, or files may be exchanged between user client 6 and representative client 44 using similar techniques. As seen in FIG. 1, in addition to displaying video feeds 22A, 22B, user client 6 may cause output device 14 to display multimedia content 26 within GUI 20. In some examples, multimedia content 26 may include one or more documents, files, images, animations, videos, or other graphical representations. In other examples, multimedia content 26 may include sound, voice, or other audio data. In still other examples, multimedia content 26 may include a combination of graphical representations and audio data. In some examples, a computing device coupled to video communication session 38 may generate a graphical representation of all or a portion of a graphical user interface generated by the computing device. The graphical user interface may then be shared with other computing devices coupled to the video communication session thereby enabling other computing devices to display the graphical representation of the graphical user interface.

In the example of FIG. 1, multimedia content 26 may be output by each computing device 4 and 42 contemporaneously using user client 6 and representative client 44, respectively. In this way, user 16 and representative 52 may simultaneously view and/or hear multimedia content 26. In some examples, multimedia content 26 may be selected by user 16 using user client 6. In other examples, representative 52 may select multimedia content that will be output contemporaneously at each computing device coupled to video communication session 38. In some examples, multimedia content 26 being output to user client 6 and representative client 44 may be different.

Communication server 32, as shown in FIG. 1, may perform one or more operations that enable a user to participate in a secure, location-based multimedia experience with at least one representative to facilitate business and/or seek assistance on a matter. As discussed herein, the secure, location based multimedia experience may be between one or more users and one or more representatives. As shown in FIG. 1, server device 30 includes communication server 32. Examples of server device 30 may include a personal computer, a laptop computer, a television with one or more processors embedded therein or coupled thereto, a handheld computer, a workstation, a data storage system, a supercomputer, or a mainframe computer. Communication server 32 may generate, manage, and terminate video communication sessions such as video communication session 38. In some examples, communication server 32 may include one or more modules executing on one or more computing devices, such as server device 30, that performs operations described herein.

As shown in FIG. 1, communication server 32 may include components such as location authentication module 34, user authentication module 35, session module 36, and video communication session 38. Communication server 32 may also include components such as user information data store (UID) 40. Components of communication server 32 may be physically, communicatively, and/or operatively coupled by communication channel 33. Examples of communication channel 33 may include a system bus, inter-process communication data structures, and/or a network connection.

In accordance with one or more techniques of the present disclosure, to quickly and efficiently connect users and representatives to video communication sessions, representative client 44 may initially be connected to video communication session 38. User client 6 may connect to video communication session 38 once the combination of the location of user 16 and the identity of user 16 has been authenticated. For example, if a customer (e.g., user 16) of a bank wanted to participate in a video communication session to facilitate business and/or discus a matter, the physical location of user 16 must first be authenticated. For instance, the location may be authenticated when user 16 is determined to be within the defined location 18. In the example of the remote teller of a bank, the defined location 18 may be a banking booth. Authenticating the location of the user provides security such that a person may not fake spoof a location.

In some examples, location authentication module 34 may initially receive location information corresponding to a physical location of user 16. Location module 34 may authenticate the physical location of user 16 based on the location information. In some examples, authenticating the physical location of the use based on the location information may include determining that the physical location of the user is at a defined location. In other words, determining that user 16 is within the defined location 18. In one example, location module 34 may receive location information of a physical location of a computing device associated with the user. For example, location module 34 may receive physical location information of computing device 4, which is associated with user 16.

In one example, a computing device associated with a user may include active near field communication (NFC) hardware. For example, computing device 4 may include NFC hardware and user 16 may place computing device 4 over an NFC device (e.g., passive NFC tag) placed at the defined location 18. Location module 10 may transmit location information including a location identifier to location authentication module 34. Location authentication module 34 may authenticate the physical location of user 16 based on the location information received from computing device 4. That is, location authentication module 34 may determine whether the physical location of computing device 4 is at the defined location 18 based on the location identifier contained within the location information. While computing device 4 is over the NFC tag, the computing device 4 and/or location authentication module 34 may periodically monitor the proximity of the NFC tag to the computing device 4. Prior to user client 6 being coupled to video communication session 38, when computing device 4 is no longer in range with the NFC tag, location authentication module 34 may determine to end the connection process. In other example when user client 6 is coupled to video communication session 38, when computing device 4 is no longer in range with the NFC tag, location authentication module 34 may determine to end the video communication session 38.

In another example, the location information may be based on global positioning system (GPS) coordinates. For example, location authentication module 34 may receive GPS coordinates from computing device 4 associated with user 16. For example, location module 10 of computing device 4 may include a GPS radio that may determine and send GPS coordinates of computing device 4 to the location authentication module 34. Location authentication module 34 may monitor the GPS coordinates being received and determine when computing device 4 is no longer at the defined location 18. As discussed herein, when computing device 4 is no longer at the defined location 18, location authentication module 34 may determine to end the connection process or end the video communication session 38.

In another example, the location information may be based on a randomly generated code provided at the defined location 18. For example, a banking booth may include a randomly generated code at the banking booth (e.g., at the defined location 18) and user 16 may enter the randomly generated code to authenticate his or her physical location. In one example, server 30 may generate a code and presents the generated code to the user. Server device 30 may receive a code provided by user 16 as the location information. Server device 30 may compare the received code to the generated code to authenticate users' 16 physical location.

In some examples, responsive to authenticating the physical location of the user, user authentication module 35 may receive personal identification information associated with a user. For example, user authentication module 35 may enable communication module 8 to display an input box for user 16 to enter personal identification information. The personal identification information may include a personal identification number (PIN) associated with a banking account, a username and password combination, biometric data (e.g., a fingerprint, facial information, iris recognition, etc.), and/or other authentication information known in the art.

In other examples, the location information and personal identification information may be authenticated in a single transaction. For example, location authentication module 34 and user authentication module 35 may receive location information and personal identification information at substantially the same time. In one example, when user 16 enters personal identification information, location module 10 may simultaneously sent location information corresponding to a physical location of user 16. In other example, the location information may be authenticated once the personal identification information of the user has been authenticated.

As seen in FIG. 1, server device 30 may include user information data store (UID) 40. User authentication module 35 may compare the personal identification information received from user 16 to user data stored in UID 40. UID 40 may include any suitable data structure to store information such as a database, lookup table, array, linked list, etc. As shown in FIG. 1 UID 40 may include information associated with users. For example, UID 40 may be a database associated with a business entity (e.g., a bank) and includes information regarding user 16. The personal identification information stored in UID 40 may be information used to authenticate the identity a particular user. Thus, authenticating the location and identity of a user attempting to couple to a video communication session, may decrease the risk of having of someone spoofing identity to access personal and/or sensitive information of a user.

In some examples, upon successful authentication of the physical location and the personal identification information of the user, a computing device associated with the user may be coupled to a video communication session. For example, after the location of user 16 is determined to be at defined location 18 and user 16 has provided proper personal identification information, computing device 4 may send a request to server device 30 requesting to couple to a video communication session.

Session module 36 may create, manage, and terminate video communication sessions, such as video communication session 38. For instance, session module 36 may determine when a user's location and personal information have been authenticated and generate a video communication session. For example, session module 36 may include functionality to determine whether representatives are available to service requests, and in some instances, connect users with available representatives.

In some examples, each time a computing device sends requests to couple to a video communication session, session module 36 may create a new video communication session. For example, after the location and personal identification information is authenticated for user 16, session module 36 may generate and couple computing device 4 and computing device 42 to video communication session 38. In this example, session module 38 may determine that representative 52 is available and join representative client 44 to video communication session 38. In other examples, representative clients may previously be coupled to a video communication such that when the location and personal identification information is authenticated for a user, the computing device associated with the user is joined to an already existing video communication session including a representative client.

Session module 36 may also terminate video communications sessions, such as video communication session 38. In some examples, either user client 6 or representative client 44 may select to end video communication session 38 and session module 36 may terminate video communication session 38 and decouple user client 6 and representative client 44 from video communication session 38. In other examples, either user client 6 or representative client 44 may select to end video communication session 38 and user client 6 may be decoupled from the video communication session 38, while maintaining representative client 44 coupled to video communication session 38. In this instance, representative client 44 may remain coupled to video communication session 38 until another user's location and personal identification information has been authenticated and a computing device associated with the user is coupled to the video communication session.

Video communication session 38 may further include session information such as a duration of the video communication session, security settings of the video communication session, and any other information that specifies a configuration of the video communication session. Communication server 32 may send and receive information from user and representative clients coupled to video communication session 36 thereby enabling users participating in the video communication session to exchange information.

Session module 36 may determine that the location and personal identification information of user 16 have been authenticated. For example, location authentication module 34 and user authentication module 35 may send a message to session module 36 indicating that the physical location and the personal identification information of user 16 has been authenticated. Session module 26 may determine whether a video communication session currently exists including a representative client 44 coupled to the video communication session or if a new video communication session is to be generated.

Upon authentication, session module 26 may receive a request from computing device 4 requesting to join a video communication session, and upon receiving the message, session module 34 may generate video communication session 38 and send messages to user client 4 and representative client 44 that enable the respective clients to couple to video communication session 38. Once connected, user 16 and representative may communicate, for example, to facilitate a business transaction. In some examples, multiple protocols may be used by session module 36 to couple user clients and representative clients to video communication session 38. For instance, user clients and representative clients may couple to server device 30 using a first protocol while location authentication module 34, user authentication module 35, and session module 36 may communicate using a second protocol. Communication server 32 may apply protocol translation techniques to enable communication between different protocols.

When coupled to video communication session 38, user client 6 may cause output device 14 to display GUI 20. GUI 20 may include graphical elements such as video feeds 22A and 22B (collectively referred to as "video feeds 22"), visual representations 24A and 24B (collectively referred to as "visual representations 24"), and multimedia content 26. Video feeds 22 may include visual representations 24 of other users and/or representatives communicating via video communication session 38. For example, video feed 22A may include a visual representation 24A of representative 52 who is communicating via video communication session 38. Video feed 22A may be generated based on video data received from video communication session 38, which received the video data from computing device representative client 44. User client 6 may cause input device 12 to generate the video data in video feed 22B that includes the visual representation 24B of user 16. As shown in FIG. 1, GUI 16 may further include multimedia content 26 that may include other graphical representations, documents such as bank statements, images, and text.

In some examples, a video communication session that includes a representative may already exist. That is, a representation client 44 is already coupled to video communication session 38. For instance, session module 36 may receive a request to join a video communication session from user client 6 and determines if a video communication session with an available representative 52 already exists. If an existing video communication session exists with an available representative, session module 36 may couple user client 6 of computing device 4 to video communication session 38. If it is determined that there is not a video communication session with an available representative, session module 36 may determine whether there is an available representative client 44 associated with a representative 52 that may be coupled to a video communication session associated with the same topic. If so, session module 36 may generate a video communication session and couple both user client 6 and representative client 44 to the video communication session. For example, session module 36 may send messages to user client 6 and representative client 44 that are usable by the clients to connect to the video communication session.

In another example, session module 36 may determine that no representatives are available. In such examples, session module 36 may send a message to user client 6 indicating that no representatives are currently available. In that instance, in response to the message, session module 36 may queue the request to couple to the video communication session from user 4.

As discussed herein, a user and/or representative may to end the video communication session 38 upon completion of the business transaction. However, if during video communication session 38, a physical location of computing device 4 is determined to exit the defined location 18, session module 36 may automatically decouple user client 6 from video communication session 38. In either case, session module 36 may send a message to computing device 4 and/or representative client 44 indicating that computing device 4 and/or computing device 42 is decoupled and the video communication session has been terminated.

Techniques of the present disclosure may include one or more advantages. For example, the secure, location-based multimedia experience may increase the confidence of a user may have in facilitating business using video communication session. Additionally, providing users and option to conduct business and/or discuss matters via the video communication session may potentially reduce customer wait times and/or increase the time during the day when customers can interact with representatives of a business entity. Techniques of the disclosure may also enable representatives to be utilized more efficiently by reducing the number of representatives required to be physically present at each business location, decreasing the amount of downtime experience by each representative, and automatically connecting a representative to the video communication session when a request to couple to the video communication session is received by the communication server. In some examples, video communication sessions that provide multiple audio and video feeds may provide a media-rich environment that may improve the overall experience and increase the confidence of the customer.

Example Device

Figure 2:
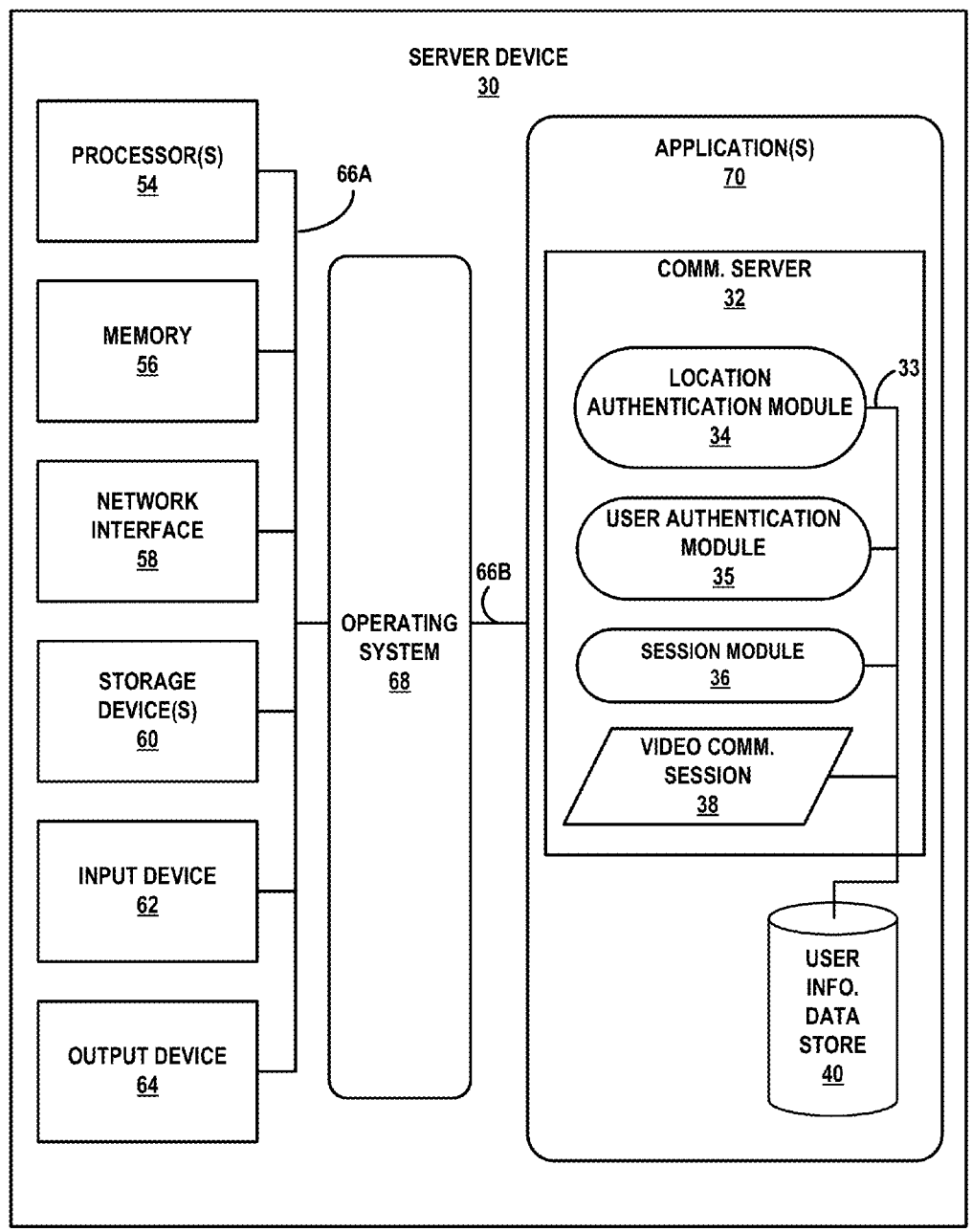
FIG. 2 is a block diagram illustrating further details of one example of a server device shown in FIG. 1, in accordance with one or more aspects of the present disclosure.

FIG. 2 is a block diagram illustrating further details of one example of a server device shown in FIG. 1, in accordance with one or more aspects of the present disclosure. FIG. 2 illustrates one particular example of server device 30, and many other example embodiments of server device 30 may be used in other instances.

As shown in the specific example of FIG. 2, server device 30 includes one or more processors 54, memory 56, a network interface 58, one or more storage devices 60, input device 62, and output device 64. Server device 30 also includes an operating system 68 that is executable by server device 30. Server device 30, in one example, further includes communication server 32 that is also executable by server device 30. Each of components 54, 56, 58, 60, 62, 64, 68, 70, 30, 32, 33, 34, 35, 36, 38, and 40 may be interconnected (physically, communicatively, and/or operatively) by communication channels 33, 66A-B for inter-component communications.

Processors 54, in one example, are configured to implement functionality and/or process instructions for execution within server device 30. For example, processors 54 may be capable of processing instructions stored in memory 56 or instructions stored on storage devices 60.

Memory 56, in one example, is configured to store information within server device 30 during operation. Memory 56, in some examples, is described as a computer-readable storage medium. In some examples, memory 56 is a temporary memory, meaning that a primary purpose of memory 56 is not long-term storage. Memory 56, in some examples, is described as a volatile memory, meaning that memory 56 does not maintain stored contents when the computer is turned off. Examples of volatile memories include random access memories (RAM), dynamic random access memories (DRAM), static random access memories (SRAM), and other forms of volatile memories known in the art. In some examples, memory 56 is used to store program instructions for execution by processors 54. Memory 56, in one example, is used by software or applications running on server device 30 (e.g., applications 70) to temporarily store information during program execution.

Storage devices 60, in some examples, also include one or more computer-readable storage media. Storage devices 60 may be configured to store larger amounts of information than memory 56. Storage devices 60 may further be configured for long-term storage of information. In some examples, storage devices 60 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Server device 30, in some examples, also includes a network interface 58. Server device 30, in one example, utilizes network interface 58 to communicate with external devices via one or more networks, such as one or more wireless networks. Network interface 58 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, server device 30 utilizes network interface 58 to wirelessly communicate with an external device such as computing device 4, 42 of FIG. 1.

Server device 30, in one example, also includes one or more input devices 62. Input device 62, in some examples, is configured to receive input from a user through tactile, audio, or video feedback. Examples of input device 62 include a presence-sensitive screen, a mouse, a keyboard, a voice responsive system, video camera, microphone or any other type of device for detecting a command from a user.

One or more output devices 64 may also be included in server device 30. Output device 64, in some examples, is configured to provide output to a user using tactile, audio, or video stimuli. Output device 64, in one example, includes a presence-sensitive screen, a sound card, a video graphics adapter card, or any other type of device for converting a signal into an appropriate form understandable to humans or machines. Additional examples of output device 64 include a speaker, a cathode ray tube (CRT) monitor, a liquid crystal display (LCD), an organic light emitting diode (OLED) display, or any other type of device that can generate intelligible output to a user.

Server device 30 may include operating system 68. Operating system 68, in some examples, controls the operation of components of server device 30. For example, operating system 68, in one example, facilitates the interaction of one or more applications 70 (e.g., communication server 32) with processors 54, memory 56, network interface 58, storage device 60, input device 62, and output device 64. As shown in FIG. 2, communication server 32 may include location authentication module 34, user authentication module 35, session module 36, and video communication session 38, as described in FIG. 1. Applications 70, location authentication module 34, user authentication module 35, session module 36, and video communication session 38 may each include program instructions and/or data that are executable by server device 30. For example, location authentication module 34, user authentication module 35, and session module 36 may include instructions that cause communication server 32 executing on server device 30 to perform one or more of the operations and actions described in the present disclosure.

In accordance with aspects of the present disclosure, location authentication module 34 may receive location information corresponding to a physical location of a user. The location information may be received from user client 6 via network interface 58. Location authentication module 34 may authenticate the physical location of the user based on the location information. Responsive to authenticating the physical location of the user, user authentication module 35 may receive personal identification information associated with the user. The personal identification information may be received from user client 6 by network interface 58. User authentication module 35 may authenticate the personal identification information of the user. Upon successful authentication of the physical location and the personal identification information of the user, session module 36 may determine that a video communication session 38 coupled with representative client 44 is available. Consequently, session module 36 may cause network interface 58 to send a message to computing device 4 (associated with user 16) that may include information that enables user client 6 executing on computing device 4 to couple to video communication session 32. In this way, the user whose location and personal identification information was authenticated may participate in a video communication session that includes a representative (e.g., representative 52).

Example System

Figure 3:
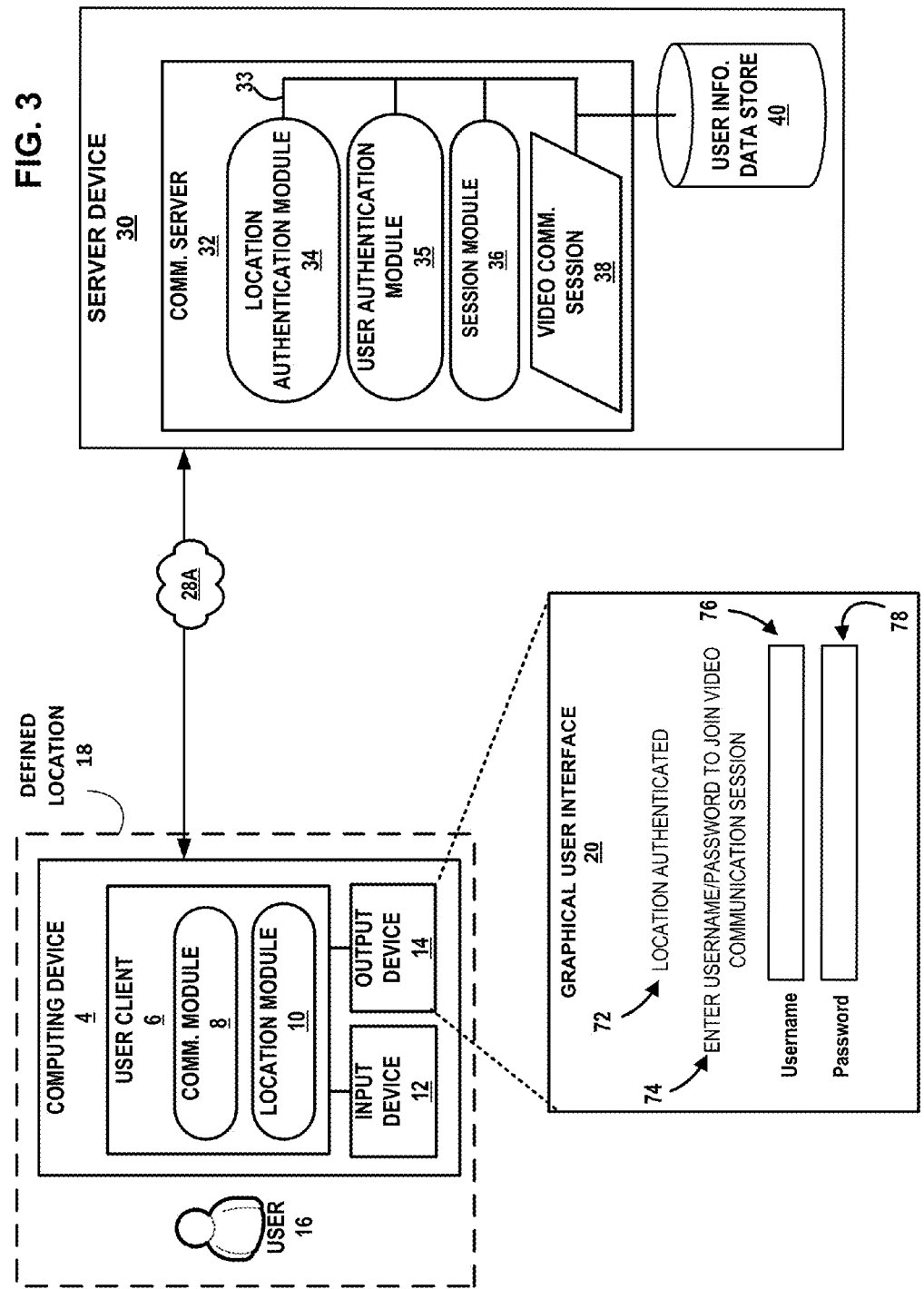
FIG. 3 is a block diagram illustrating an example of a system for authenticating a user, in accordance with one or more aspects of the present disclosure.

FIG. 3 is a block diagram illustrating an example of a system for authenticating a user, in accordance with one or more aspects of the present disclosure. As shown in the example of FIG. 3, computing device 4 is physically located within defined location 18. Server device 30 may receive location information corresponding to a physical location of user 16. For example, location authentication module 34 may receive location information from location module 10 of computing device 4. As discussed herein, location authentication module 34 may receive the location information using NFC technology, GPS coordinates, and entering a randomly generated password provided at the defined location 18, among others. For example, location module 10 may enable NFC technology of computing device to interact with a NFC device (e.g., NFC tag) located at the defined location 18. In another example, location authentication module 34 may receive GPS coordinates by a GPS radio of computing device 4. In other examples, location module 10 may be activated when computing device 4 is at the defined location 18. That is, location module 10 may send location information to location authentication module 34 when computing device 4 is at the defined location 18.

In this example, location authentication module 34 has received the location information corresponding to a physical location of user 16 and has authenticated the physical location of user 16. As seen in GUI 71 of FIG. 3, GUI 71 may display text 72 indicating that the physical location of user 16 has been authenticated. User authentication module 35, in response to the physical location being authenticated, may send a message to user client 6 causing communication module 8 to provide data to prompt user 16 to enter personal identification information. In one example, user authentication module 35 may send the message to user client 6 causing communication module 8 to provide data to prompt user 16 to enter personal identification information prior to the location of user 16 being authenticated. In that instance, the personal identification information entered and the location information may be sent to communication server 32 at the same, or substantially the same time.

As seen in FIG. 1, text 74 may instruct user to enter personal identification information to join a video communication session. In this example, the personal identification information is a username 76 and password 78 associated with user 16. However, the personal identification may include information that may be used to authenticate the identity of a user attempting to couple to a video communication session. User authentication module 35 may compare the provided username 76 and password 78 with user information stored in UID (40) 40. In an example of a bank, user 16 may provide a username and password associated with an account at a bank.

In one example, upon authentication of the physical location and the personal identification, session module 36 may send a message to user client 4 that enables computing device 4 to couple to video communication session 38. As discussed herein, video communication session 38 may be an already existing video communication session 38 where a representative client 44 (as seen in FIG. 1) may already be coupled to the video communication session 38. In other example, session module 36 may generate video communication session 38 in response to authenticating the physical location and the personal identification information of user 16. In addition to coupling user client 6 to video communication session 38, session module 36 may also couple representative client (as seen in FIG. 1) when user 16 is authenticated.

Example Process

Figure 4:
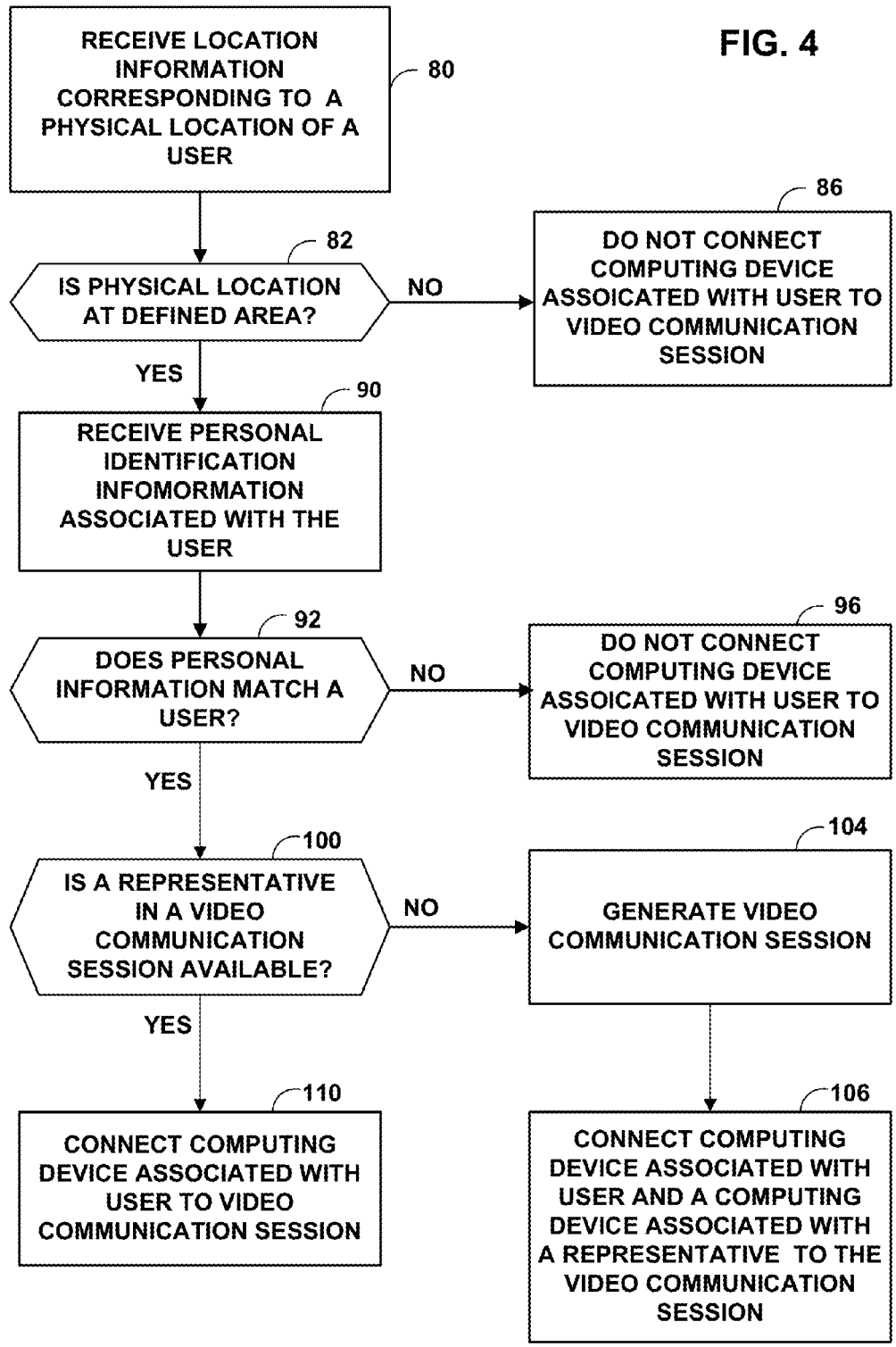
FIG. 4 is a flow diagram illustrating example process of a computing device for coupling a computing device associated a user and a computing device associated with a representative in a video communication session, in accordance with one or more aspects of this disclosure.

FIG. 4 is a flow diagram illustrating example process of a computing device for coupling a computing device associated a user and a computing device associated with a representative to a video communication session, in accordance with one or more aspects of this disclosure. For purposes of illustration only, the example process is described below within the context of communication server 32 of server device 30 as shown in FIG. 1.

In one example, communication server 32 may receive location information corresponding to a physical location of a user (80). For example, communication server 32 may receive location information from computing device 4 as described herein with respect to FIG. 1. In response to receiving location information from user client 6, communication server 32 may determine whether the physical location is at a defined location (82). For example, communication server 32 may determine whether the physical location is at a defined location as described herein with respect to FIG. 1. If the physical location is not at the defined location ("NO" branch of 82), communication server 32 may not connect computing device associated with the user to the video communication session. If the physical location is at the defined location ("YES" branch of 82), communication server 32 may receive personal identification information associated with the user (90). For example, responsive to the location authentication module 34 authenticating the physical location of user 16, communication server 32 may receive personal identification information of user 16 as described herein with respect to FIG. 1. In response to receiving the personal identification information, communication server 32 may determine whether the personal identification information matches a user (92). If the personal identification information does not match a user ("NO" branch of 92), communication server 32 may not connect computing device associated with the user to the video communication session (96). If the personal identification information matches a user ("YES" branch of 92), communication server 32 may determine if a representative in a video communication session is available (100). For example, if user authentication module 35 successfully authenticates the personal identification information received from computing device 4, session module 36 may determine if a representative in a video communication session 38 is available.

If a representative in a video communication session is not available ("NO" branch of 100), communication server 32, may generate a video communication session (104). For example, in response to no representatives in existing video communication sessions being available, session module 36 may generate a new video communication session 38. In response to generating the video communication session, communication server 32 may connect computing device 4 associated with user 16 and computing device 42 associated with representative 52 to the video communication session (106). For example, session module 36 may couple user client 6 of computing device 4 associated with user 16 and representative client 44 of computing device 42 associated with representative 52 to a video communication session 38. If a representative in a video communication session is available ("YES" branch of 100), communication server 32 may connect computing device associated with user 16 to the video communication session (110). For example, in response to an existing video communication session having an available representative, session module 36 may couple computing device 4 associated with user 16 to video communication session 38, where computing device 42 associated with representative 52 is already coupled to video communication session 38.

Example Device

Figure 5:
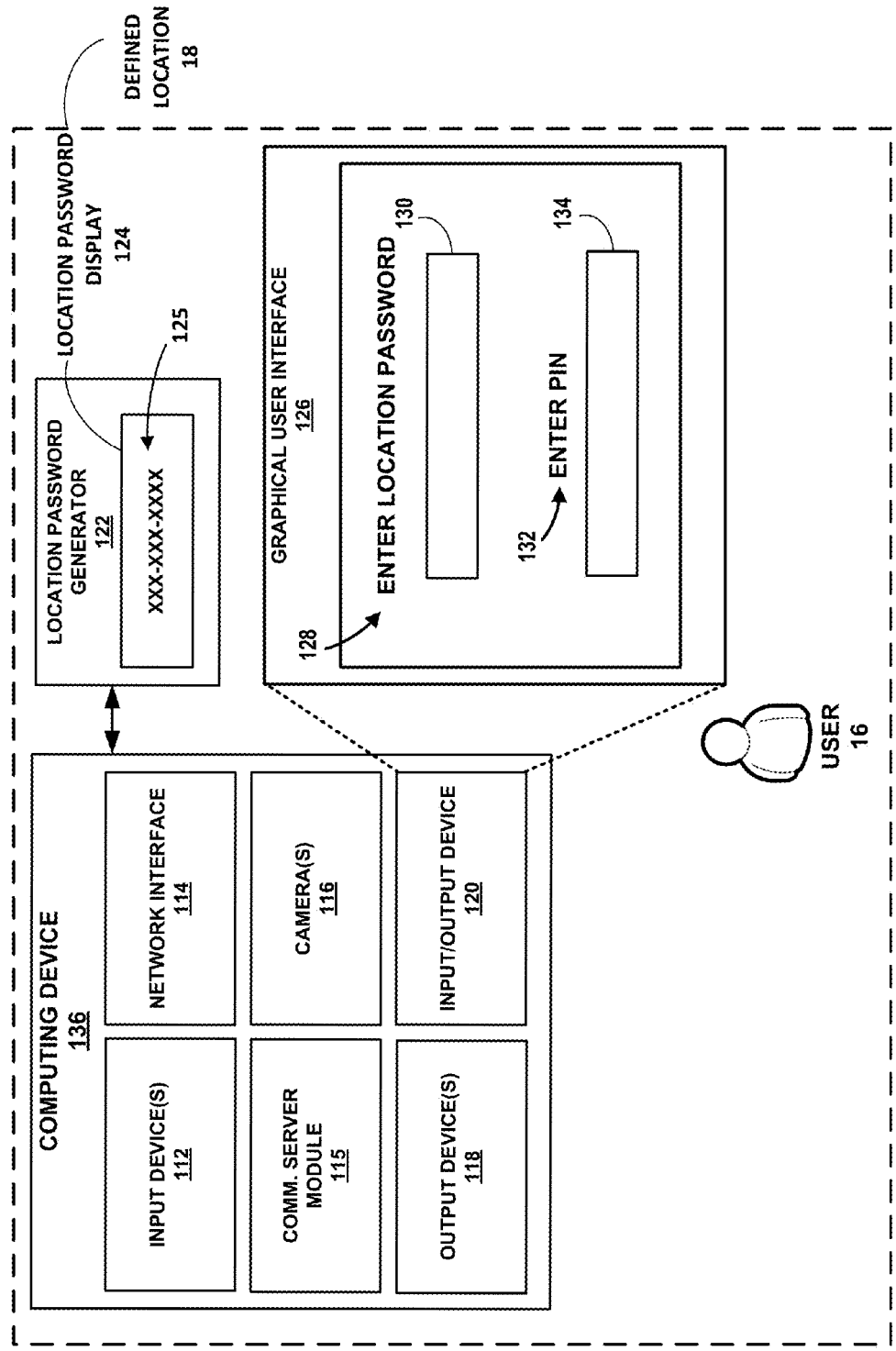
FIG. 5 is a block diagram illustrating an example of a computing device configured to enable a user to communicate with a representative participating in a video communication session, in accordance with one or more aspects of the present disclosure.

FIG. 5 is a block diagram illustrating an example of a computing device configured to enable a user to communicate with a representative participating in a video communication session, in accordance with one or more aspects of the present disclosure. In the example of FIG. 5, user 16 is interacting with a virtual machine installed by a business entity. As shown in FIG. 5, the computing device 136 associated with the user 16 includes communication server module 115.

In this example, user 16 may enter defined location 18 (e.g., a virtual banking booth) to facilitate business and/or seek assistance regarding a matter. The virtual banking booth, for example, may be located within a business entity (e.g., a bank) or at other locations not affiliated with the business entity (e.g., a shopping center) such that users may conveniently access banking representatives to facilitate business and/or seek assistance without having to physically be present within the bank or wait in line at the bank. The video communication sessions including the representative may allow users to conduct more complex transactions and feel more comfortable conducting transactions electronically.

Computing device 136 may include one or more input devices 112 (e.g., a microphone), a camera 116, one or more output devices 118 (e.g., a speaker), and input/output device 120. Computing device 136 may also connect to a wired or wireless network using one or more network interfaces 114. In some examples, input/output device 120 may include a presence-sensitive screen (i.e., a touch-sensitive user interface). Thus, input/output device 120 may generate one or more signals corresponding to a location selected on the presence-sensitive screen. In some examples, presence-sensitive screen may detect touch-based input (e.g., a finger, pen, stylus, etc.) that may make physical contact with presence-sensitive screen. In other examples, the presence-sensitive screen detects a presence of an input (e.g., a finger, pen, stylus, etc.) that may be in proximity to, but does not physically touch, the presence-sensitive screen. Presence-sensitive screen, in some examples, may generate a signal corresponding to the location of the detected input. Signals generated by the selection of the corresponding location may be provided as data to components of computing device 110. Additionally, input/output device 120 may generate one or more signals corresponding to a location selected by a gesture performed on or near the presence-sensitive screen.

Input/output device 120 may also display graphical content. For example, communication server module 115 may cause input/output device 120 to display GUI 126. Graphical content, generally, may be interactive and/or non-interactive graphical content and include any visual depiction displayed by input/output device 120. As seen in FIG. 5, user 16 is at the defined location 18. In one example, a boundary of the defined location 18 may be monitored such that when server device 30 determines that the boundary of the defined location 18 has been crossed a first time, communication server module 115 may cause input/output device 120 to initiate a connection request to a video communication session. For example, in response to determining that a door to a virtual banking booth has been opened, communication server module 115 may cause input/output device 120 to display text prompting user 16 to "enter location password" 128 and to "enter PIN" 132. Additionally, when the boundary of the defined location 18 has been crossed a second time, server device 20 may determine a video communication session has been exited and terminate the video communication session. For example, if response to determining that a door to the virtual banking booth has been opened a second time (e.g., a user leaves the virtual banking booth), communication server module 115 may terminate the video communication session.

As seen in FIG. 5, the defined location 18 includes a location password generator 122. Location password generator 122 includes a location password display 124, where a randomly generated location password "XXX-XXX-XXXX" 125 is displayed. Location password 125 may be randomly generated based on a time interval and/or when a user and/or representative exit a video communication session. In one example, after user 16 enters defined location 18 and initiates a connection request, user 16 may enter the location password 125 within the input box 130. User 16 may then enter personal identification information. In this example, server device 30 provides data to display text prompting user to enter PIN. User 16 may enter a PIN into input box 134. In one example, the PIN may be a PIN associated with an account that user 16 has at the business entity. For example, the PIN may be a PIN associated with a bank account (e.g., savings, checking, credit, etc.) user 16 has with a bank. In another example, a user may swipe a credit or debit card to obtain account information and subsequently enter a PIN associated with the credit or debit card account.

As discussed herein, FIG. 5 illustrates an example where user 16 is interacting with a virtual teller machine installed by a business entity. That is, the user is not using his or her own personal computing device (e.g., personal mobile phone) to participate in a secure, location-based virtual collaboration. In this instance, user 16 may enter the defined location 18 (e.g., a virtual banking booth) and communication server module 115 may authenticate the location and personal identification information. As discussed herein, user 16 may enter a randomly generated password at input box 130 and enter personal identification information (e.g., a PIN) at input box 134.

However, in other examples, the physical location of user 16 may be authenticated using a personal computing device associated with user 16 (e.g., a personal mobile phone, tablet). For example, when user 16 enters the defined location 18, communication server module 115 of computing device 136 may receive location information from a personal computing device associated with user 16 (e.g., computing device 4 of FIG. 1). After the location of user 16 has been authenticated, user may subsequently interact with GUI 126 of computing device 110 to authenticate personal identification information and to participate in the video communication session.

Example Interface

Figure 6:
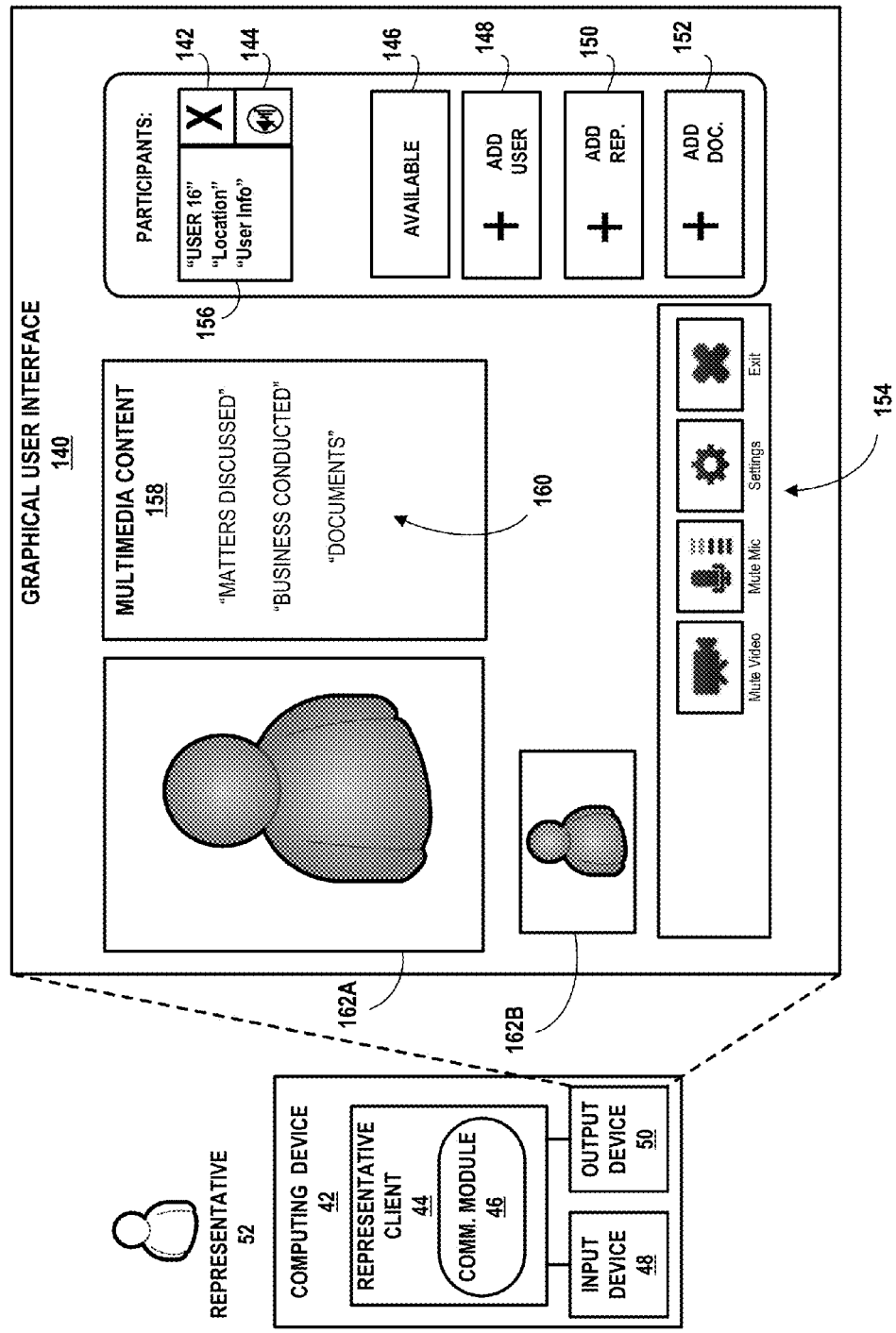
FIG. 6 is a block diagram illustrating an example of a graphical user interface for interacting with a business representative, in accordance with one or more aspects of the present disclosure.

FIG. 6 is a block diagram illustrating an example of a graphical user interface for interacting with a business representative, in accordance with one or more aspects of the present disclosure. As shown in FIG. 6, computing device 42 includes representative client 44, input device 48 and output device 50. Representative client 44 includes communication module 46. Communication module 46 may cause output device 50 to display graphical user interface (GUI) 140. GUI 140 may include control buttons 142-154. GUI 140 may further include user information 156.

As shown in FIG. 6, GUI 140 may provide one or more video feeds 162A and 162B (collectively referred to as "video feeds 162") and multimedia content 158. Video feeds 162 may be associated with a user and a representative participating in a video communication session. For instance, video feed 162A may include a visual representation of representative 52 that is generated by communication module 46 based on input data from input device 50 (e.g., a video camera). Video feed 162B may include visual representations of a user participating in the video communication session. For instance, video data generated by a computing device associated with users and coupled to the video communication session may be received by representative client 44 and displayed by output device 50.

In some examples, multimedia content 158 that may include graphical content 160. Graphical content 164 may include details regarding matters discussed and/or business that has been conducted. For example, if a user that the representative is communicating with via the video communication session deposits money into an account, as representative 52 performs the transaction, graphical content 160 display information regarding the transaction (i.e., "User X" has deposited $X.XX into account number "XXX-XXX-XXXX"). Additionally, the graphical content 164 may include documents. For example, if there is an issue regarding a credit card statement, for example, the statement at issue may be displayed as graphical content 160 within the GUI 140.

In some examples, GUI 140 may include user information 156 that is associated with "USER 16". For instance, when a computing device associated with "USER 16" is coupled to the video communication session, the communication server may select user information associated with each user and send the profile information to computing device 42. Communication module 46, upon receiving the user information may cause output device 50 to display the user information in GUI 140. User information may include attributes associated with a user. For instance, user information may include a name of user 16 participating in the video communication session, the location of the user, current account information, and other attributes of the user.

GUI 140 may further include control button 142 that when selected causes representative client 44 to send a message to communication server 32 to remove a user from the video communication session. To remove a user from the video communication session, representative 52 may provide a user input to select control button 142. In response to the selection, communication module 46 may generate a message that indicates to decouple a computing device associated with a user coupled to the video communication session. For example, control button 142 when selected causes representative client 44 to send a message to communication server 32 to remove computing device 4 associated with user 16 from the video communication session.

In some examples, GUI 140 may include control button 144 which may modify a volume level of an audio stream associated with a computing device of a user that is sent by the communication server to computing devices coupled to a video communication session. For example, control button 144 may be associated with "USER 16" as indicated by user data 156. Representative 52 may wish to modify a volume level of an audio stream associated with "USER 16" that is sent by a communication server to computing devices coupled to the communication server.

To modify the volume level of an audio stream associated a participant in the video communication session (e.g., user 16), representative 52 may provide a user input to select control button 144. In response to the selection, communication module 46 may generate a message that indicates a modification to the volume level. In some examples, modifying a volume level may include muting or unmuting an audio stream, while in other examples modifying a volume level may include changing the volume of the audio stream from a lower volume to a higher volume or higher volume to lower volume. Communication module 46 may then send the message to a communication server. The communication server, upon receiving the message may modify the volume level associated with the audio stream based at least in part on the message, which indicates the volume level modification. When each computing device receives the audio stream, the volume level associated with the audio stream may reflect the modification indicated in the message.

In some examples, GUI 140 may include control button 146 to indicate availability of representative 52. For instance, representative client 44 may be coupled to a video communication session available for a computing device associated with a user to couple to the video communication session. If representative 52 becomes unavailable (e.g., answering a phone call), representative may select control button 146. In response to receiving a user input selecting control button 146 to indicate unavailability, communication module 46 may generate a message that indicates that the representative 52 associated with the representative client 44 is unavailable. Communication module 46 may send the message to a communication server such that any computing clients that subsequently are authenticated and being connected to a video communication session will not be coupled to the video communication session that includes representative client 44. Once representative 52 becomes available, representative 52 may select control button 146 and communication module may generate and send a message indicating availability to a video communication session. In this way, a representative may have a continuous connection to a video communication session but still may indicate whether or not they are available to assist a user.

In some examples, GUI 140 may include a control button 148 to add an additional user to the video communication session. For instance, representative 52 may provide a user input to select control button 148 that causes communication module 46 to display a menu that enables representative 52 to indicate one or more users that may be added to the video communication session. In response to receiving a user input to select one or more users to be added, representative client 44 may send a message to a communication server to invite the selected users. GUI 140 may further include a control button 150 that enables representative to add additional representatives in a similar manner as previously described for control button 148.

In some examples, GUI 140 may include a control button 152 to add a document to the video communication session. For instance, representative 52 may provide a user input to select control button 152 that causes communication module 46 to display a menu that enables representative 52 to indicate one or more documents that may be added to the video communication session (e.g., as graphical content 160).

In some examples, GUI 140 may include control buttons 154. For example, representative may wish to modify a volume level of an audio stream and or video data of a video stream associated with the representative that is sent by a communication server to computing devices coupled to the communication server. To modify the volume level and/or video data may be performed in a similar manner as previously described for control button 144. Additionally, representative 52 may decouple representative client 44 from a video communication session by providing user input selecting "Exit" from control buttons 154. Moreover, representative 52 access various setting of the video communication session by providing user input selecting "Setting" from control buttons 154.

Example Process

Figure 7:
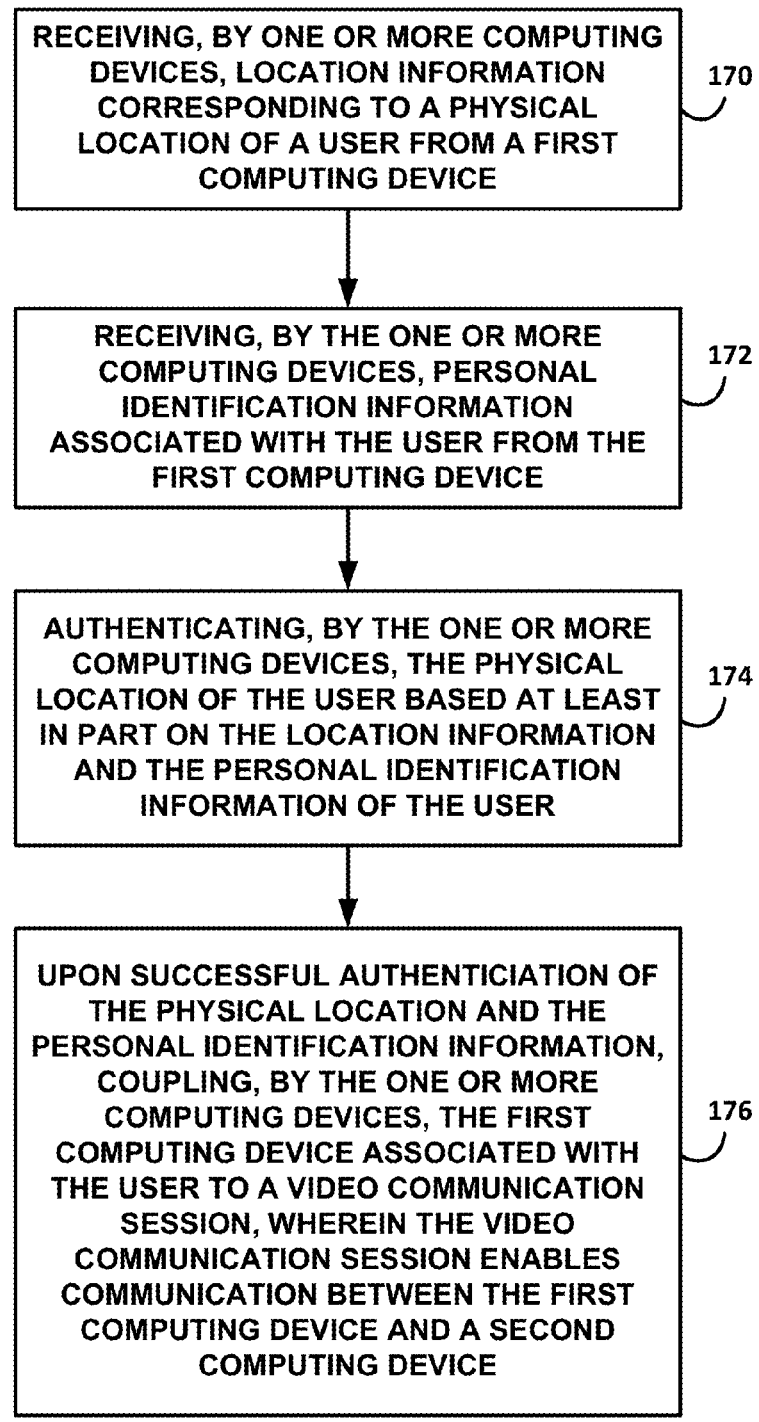
FIG. 7 is a flow diagram illustrating an example process of a computing device for coupling a computing device associated with a user to a video communication session, in accordance with one or more aspects of this disclosure.

FIG. 7 is a flow diagram illustrating an example process of a computing device for coupling a computing device associated with a user to a video communication session, in accordance with one or more aspects of this disclosure. For purposes of illustration only, the example process is described below within the context of communication server 32 of server device 30 as shown in FIG. 1. The example process illustrated in FIG. 7 may be performed by server device 30 shown in FIGS. 1 and/or 2.

The operations of FIG. 7 include receiving, by one or more computing devices, location information corresponding to a physical location of a user from a first computing device (170). For example, location authentication module 34 may receive location information corresponding to a physical location of user 16 from computing device 4. The process also includes, receiving, by the one or more computing devices, personal identification information associated with the user (172). For example, user authentication module 35 may receive personal identification information associated with user 16 from computing device 4. The process also includes authenticating, by the one or more computing devices, the physical location of the user based at least in part on the location information and the personal identification information of the user (174). For example, location authentication module 34 may authenticate the physical location of user 16 based on the location information. Additionally, user authentication module 35 may authenticate the personal identification information of user 16. The process further includes, upon successful authentication of the physical location and the personal identification information of the user, coupling, by the one or more computing devices, the first computing device associated with the user to a video communication session, wherein the video communication session enables communication between the first computing device and a second computing device (176). For example, upon successful authentication of the physical location and the personal identification information, session module 36 may couple computing device 4 to video communication session 38, where video communication session 38 enables communication between computing device 4 and computing device 42.

In one example, the example process may include responsive to receiving the location information corresponding to the physical location of a user, authenticating the physical location of the user based on the location information. The process may further include responsive to authenticating the location information, receiving the personal identification information associated with the user, and responsive to receiving the personal identification information, authenticating the personal identification information of the user.

In one example, authenticating the user based on the location information may include determining, by the one or more computing devices, that the physical location of the user is at a defined location. In one example, determining that the physical location of the user is at the defined location may include receiving location information of a physical location of the first computing device associated with the user. In one example, the location information of the physical location of the first computing device associated with the user may be received from a near field NFC device located at the defined location. For example, the one or more computing devices may receive a location identifier captured by the first computing device using near field NFC technology. In other examples, the location information of the physical location of the first computing device associated with the user may be received from a GPS device of the first computing device. For example, the one or more computing devices may receive GPS coordinates from the first computing device associated with the user, wherein the GPS coordinates are determined by a GPS radio of the first computing device. In yet another example, determining that the physical location of the user is at the defined location may include receiving, by the one or more computing devices, a randomly generated code provided at the defined location. For example, the one or more computing device may receive a code from the first computing device, where the code corresponds to a randomly generated code provided at the defined location, and where authenticating the physical location of the user may include comparing the received code to the randomly generated code.

In some examples, the video communication session is an established video communication session including the second computing device coupled to the video communication session, wherein the second computing device is associated with a representative. In other examples, the process may include determining, by the one or more computing devices, when at least one representative is available to join the video communication session, where the at least one representative is associated with the second computing device. In some examples, when the at least one representative is available to join the video communication session the process may include coupling, by the one or more computing devices, the second computing device to the video communication session, wherein the video communication session enables communication between the first computing device and the second computing device. In one example, when the first computing device and the second computing device are coupled to the video communication session, the process may include sending, by the one or more computing devices, a plurality of video feeds for display at GUIs provided by the first computing device and the second computing device. In some examples, the plurality of video feeds comprises video data of the user and the representative participating in the video communication session.

In some examples, authenticating the personal identification information of the user includes comparing, by the one or more computing devices, the personal identification information received from the user to user data stored in a UID. In some examples, the personal identification information includes at least one of a password and PIN.

In some examples, the first computing device is one of the one or more computing devices. In other examples, the first computing device is not one of the one or more computing devices.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various embodiments have been described. These and other embodiments are within the scope of the following claims

The invention claimed is:

1. A method, executing on one or more computing devices, said method comprising:
   receiving, by the one or more computing devices, location information corresponding to a physical location of a user from a first computing device;

receiving, by the one or more computing devices, personal identification information associated with the user from the first computing device;

authenticating, by the one or more computing devices, the physical location of the user based at least in part on the location information and the personal identification information of the user wherein authenticating includes determining that the physical location of the first computing device is within a store associated with a business, the business having one or more video communication sessions associated therewith; and upon successful authentication of the physical location and the personal identification information of the user, coupling, by the one or more computing devices, the first computing device associated with the user to a video communication session, wherein the video communication session enables communication between the first computing device and a second computing device.

2. The method of claim 1, wherein authenticating further includes:

responsive to receiving the location information corresponding to the physical location of a user, authenticating the physical location of the user based on the location information;

responsive to authenticating the location information, receiving the personal identification information associated with the user; and responsive to receiving the personal identification information, authenticating the personal identification information of the user.

3. The method of claim 1, wherein authenticating the user based on the location information includes:

determining, by the one or more computing devices, that the physical location of the user is at a defined location.

4. The method of claim 3, wherein determining that the physical location of the user is at the defined location includes:

receiving location information of a physical location of the first computing device associated with the user.

5. The method of claim 4, wherein receiving location information of the physical location of the first computing device associated with the user includes:

receiving, by the one or more computing devices, a location identifier captured by the first computing device using near field communication (NFC) technology.

6. The method of claim 4, wherein receiving location information of the physical location of the first computing device associated with the user includes:

receiving, by the one or more computing devices, global positioning system (GPS) coordinates from the first computing device associated with the user, wherein the GPS coordinates are determined by a GPS radio of the first computing device.

7. The method of claim 1, wherein receiving location information corresponding to the physical location of the user comprises:

receiving, by the one or more computing devices, a code from the first computing device, wherein the code corresponds to a randomly generated code provided at a defined location, and wherein authenticating the physical location of the user comprises comparing the received code to the randomly generated code.

8. The method of claim 1, wherein the video communication session is an established video communication session including the second computing device coupled to the video communication session, and wherein the second computing device is associated with a representative.

9. The method of claim 1, further comprising:

determining when at least one representative is available to join the video communication session, wherein the at least one representative is associated with the second computing device; and when the at least one representative is available to join the video communication session, coupling, by the one or more computing devices, the second computing device to the video communication session, wherein the video communication session enables communication between the first computing device and the second computing device.

10. The method of claim 9, further comprising:

when the first computing device and the second computing device are coupled to the video communication session, sending, by the one or more computing devices, a plurality of video feeds for display at graphical user interfaces (GUIs) provided by the first computing device and the second computing device, wherein the plurality of video feeds comprises video data of the user and the representative participating in the video communication session.

11. The method of claim 1, wherein authenticating the personal identification information of the user includes:

comparing, by the one or more computing devices, the personal identification information received from the first computing device to user data stored in a user information data store.

12. The method of claim 1, wherein the personal identification information includes at least one of a personal identification number (PIN) and biometric data.

13. The method of claim 1, wherein the first computing device is one of the one or more computing devices.

14. The method of claim 1, wherein the first computing device is not one of the one or more computing devices.

15. A non-transient computer-readable storage medium comprising instructions that, when executed, cause one or more processors of one or more computing devices to perform operations comprising:

receiving location information corresponding to a physical location of a user from a first computing device;

receiving personal identification information associated with the user from the first computing device;

authenticating the physical location of the user based at least in part on the location information and the personal identification information of the user wherein authenticating includes determining that the physical location of the first computing device is within a store associated with a business, the business having one or more video communication sessions associated therewith; and upon successful authentication of the physical location and the personal identification information of the user, coupling the first computing device associated with the user to a video communication session, wherein the video communication session enables communication between the first computing device and a second computing device.

16. The non-transient computer-readable storage medium of claim 15, wherein the operations further comprise:

determining when at least one representative is available to join the video communication session, wherein the at least one representative is associated with the second computing device; and when the at least one representative is available to join the video communication session, coupling, by the one or more computing devices, the second computing device to the video communication session, wherein the video communication session enables communication between the first computing device and the second computing device.

17. The non-transient computer-readable storage medium of claim 16, wherein the operations further comprise:
when the first computing device and the second computing device are coupled to the video communication session, sending a plurality of video feeds for display at graphical user interfaces (GUIs) provided by the first computing device and the second computing device, wherein the plurality of video feeds comprises video data of the user and the representative participating in the video communication session.

18. A server comprising one or more computing devices, the one or more computing devices being configured to perform a method of:
receiving location information corresponding to a physical location of a user from a first computing device;
receiving personal identification information associated with the user from the first computing device;
authenticating the physical location of the user based at least in part on the location information and the personal identification information of the user wherein authenticating includes determining that the physical location of the first computing device is within a store associated with business, the business having one or more video communication sessions associated therewith; and
upon successful authentication of the physical location and the personal identification information of the user, coupling the first computing device associated with the user to a video communication session, wherein the video communication session enables communication between the first computing device and a second computing device.

19. The server of claim 18, wherein the method further comprises:
determining when at least one representative is available to join the video communication session, wherein the at least one representative is associated with the second computing device; and
when the at least one representative is available to join the video communication session, coupling the second computing device to the video communication session, wherein the video communication session enables communication between the first computing device and the second computing device.

20. The server of claim 19, wherein the method further comprises:
when the first computing device and the second computing device are coupled to the video communication session, sending a plurality of video feeds for display at graphical user interfaces (GUIs) provided by the first computing device and the second computing device, wherein the plurality of video feeds comprises video data of the user and the representative participating in the video communication session.

* * * * *